Nov. 7, 1967 A. CSICSATKA ET AL 3,351,712
SIMPLIFIED TIME-SAMPLING STEREOPHONIC RECEIVER CIRCUIT
Filed June 1, 1965
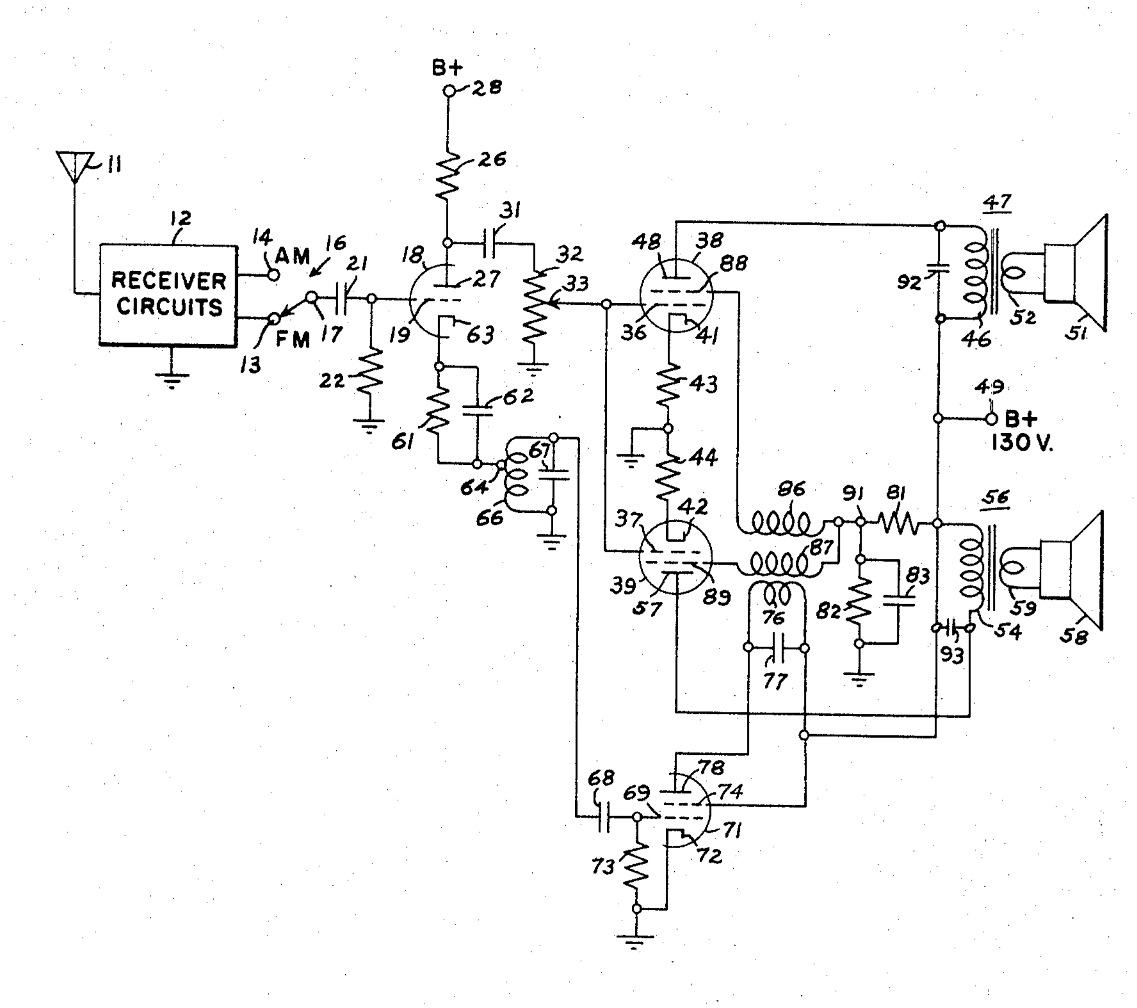
INVENTORS:
ANTAL CSICSATKA,
ROBERT M. LINZ,
BY Norman C. Fulmer
THEIR ATTORNEY.

United States Patent Office 3,351,712
Patented Nov. 7, 1967

3,351,712
SIMPLIFIED TIME-SAMPLING STEREOPHONIC RECEIVER CIRCUIT

Antal Csicsatka and Robert M. Linz, Utica, N.Y., assignors to General Electric Company, a corporation of New York Filed June 1, 1965, Ser. No. 460,364
1 Claim. (Cl. 179—15)

ABSTRACT OF THE DISCLOSURE

A time-sampling stereophonic circuit wherein the detected composite signal is applied to an amplifier at the output of which is provided a volume control for controlling the amplitude of the composite signal and accordingly the volume of the left and right outputs, the amplified and volume controlled composite signal being applied to a time sampling circuit comprising a pair of amplifying devices to which are also applied switching signals so as to selectively provide the left and right signals at the output thereof.

This invention relates to stereophonic radio reception, and particularly to circuits for deriving "left" and "right" stereo signals from a "composite" stereo signal by means of time-sampling techniques.

In the standardized FM stereo broadcasting system, the broadcast signal is a carrier-wave frequency-modulated by a "composite" signal having a frequency spectrum in the form of a sum of the "left" and "right" stereo signals, i.e., $L+R$; sidebands of a difference combination of the "left" and "right" signals, i.e. $L-R$, referenced to a suppressed subcarrier or reference wave of 38 kc. per second; and a "pilot" signal at 19 kc. per second lying in a frequency gap between the $L+R$ component and the $L-R$ sidebands component.

One type of receiver for such a signal employs time-sampling techniques. The composite signal is alternately sampled by means of diodes or amplifier devices, at a rate corresponding to the 38 kc. sideband reference wave. This sampling is achieved or controlled by a 38 kc. switching signal which is properly phased with respect to the suppressed reference wave so that the sampling process derives an "L" audio signal at the left signal channel outpue, and an "R" audio signal at the right signal channel output. These L and R signals are then amplified, if required, and fed to separate loudspeakers. Volume controls and balance controls are provided in the two audio channels to provide desired volume and balance of the reproduced stereo signals. This duplication of volume controls and balance controls in the two channels add both to the cost of parts and to the cost of electrically connecting these duplicate parts into the circuits.

An object of the invention is to provide an improved stereophonic receiver circuit.

Another object is to provide an improved stereophonic receiver circuit which is both reliable in performance and low in cost.

Further objects are to provide an improved stereophonic receiver circuit which requires only a single volume control, and which does not require any balance controls.

An additional object is to provide a time-sampling stereo circuit which is both high-fidelity in operation and economical to manufacture.

Still other objects will be apparent from the following description and claims, and from the accompanying drawing.

The improved stereophonic receiver circuit of the invention comprises, briefly and in a preferred embodiment, an amplifier channel for amplifying a composite stereo signal, this amplifier channel being provided with a volume control for varying the amplification of the composite signal, and a stereophonic demodulating time-sampling switching circuit comprising a pair of amplifier devices having input electrodes connected to the output of the amplifier channel and having output electrodes for providing sterto signals derived from the composite stereo signal. The switching circuit is actuated under control of the pilot signal which is derived from the composite signal at a point in the amplifier channel ahead of the volume control. The aforesaid amplifier devices constitute audio output stages, and their output stereo signals are respectively coupled to "left" and "right" loudspeakers The output amplifier switching devices are of the screen-grid vacuum-tube type, and the switching signal is applied in opposite phases to these screen grids to accomplish the time-sampling switching function. These screen grids are normally biased approximately half-way between the values for full amplification and for no amplification of the output amplifiers.

In the drawing, the single figure is an electrical schematic diagram of a preferred embodiment of the invention.

An antenna 11 picks up the FM stereo signal in conventional manner, and applies it to receiver circuits 12 which normally include, for reception of FM signals, a mixer circuit, intermediate frequency stages, and a demodulator of the limiter-discriminator type or ratio-detector type. The output of the receiver circuits 12 at the FM output terminal 13 comprises the composite signal in the form of an $L+R$ component in a frequency range of some 50 to 15,000 cycles per second, a pilot signal at 19 kc. per second, and L—R sidebands of a suppressed amplitude modulated subcarrier, these sidebands extending between 23 kc. per second and 53 kc. per second. The receiver circuits 12 may also comprise circuit means for reception of a AM signal, in which event there will be an AM output terminal 14.

A switch 16 alternatively connects a terminal 17 to the FM output terminal 13 and the AM output terminal 14. An amplifier device 18, which is shown as comprising a vacuum tube, has a grid input electrode 19 connected via a coupling capacitor 21 to the terminal 17. A resistor 22 is connected between the grid 19 and electrical ground. A resistor 26 is connected between the anode 27 of tube 18 and a terminal 28 of operating voltage. A coupling capacitor 31 is connected between the anode 27 and one end of a volume control potentiometer 32, the other end thereof being electrically grounded. An adjustable tap 33 of the volume control 32 is connected to input grid electrodes 36 and 37 of a pair of screen grid amplifier tubes 38 and 39. The cathodes 41 and 42 of these amplifier tubes are respectively connected to electrical ground via biasing resistors 43 and 44. The tubes 38 and 39 respectively constitute time-sampling switching devices for deriving the left and right stereo signals from the incoming composite signal, and also amplify the derived left and right signals.

A primary winding 46 of an output transformer 47 is connected between the anode 48 of tube 38 and a terminal 49 of suitable operating voltage for the tubes 38 and 39. A loudspeaker 51, which may be for reproduction of the "left" output signal, is connected to a secondary winding 52 of audio output transformer 47. Similarly, a primary winding 54 of an output transformer 56 in the other channel is connected between the voltage terminal 49 and the anode 57 of the tube 39, and a loudspeaker 58, which may be for the "right" stereo-signal, is connected to a secondary winding 59 of the audio output transformer 56.

A resistor 61 and capacitor 62 are connected in parallel between the cathode 63 of the composite signal amplifier tube 18 and a tap 64 of an inductor 66. A capacitor 67 is connected in parallel with the inductor 66, to provide therewith a resonant circuit tuned to the 19 kc. frequency of the pilot signal, thereby to select the pilot signal from the other components of the stereo composite signal. An end of the inductor 66 is electrically grounded, and the other end is coupled via a capacitor 68 to an input grid 69 of a frequency-doubler tube 71. The cathode 72 of tube 71 is electrically grounded, and a resistor 73 is connected between the grid 69 and electrical ground. A screen grid 74 is connected to the voltage terminal 49, and an inductor 76 and capacitor 77 are connected in parallel between the screen grid 74 and the anode 78 of the frequency-doubler tube 71. The inductor 76 and capacitor 77 constitute a resonant circuit tuned to be resonant at the 38 kc. frequency of the sideband reference wave, and the tube 71 functions to amplify the 19 kc. pilot signal and apply it to the 38 kc. resonant circuit 76–77, whereupon a 38 kc. reference wave or switching signal becomes generated in the resonant circuit 76–77. If a greater amplitude of pilot signal is required at the frequency doubler tube 71, the inductor tap 64 can be connected via a resistor to the top end of the volume control potentiometer 32, so that the pilot signal will be applied to the inductor 66 after amplification by tube 18. In this case, the lower ends of the resistor 61 and capacitor 62 would be electrically grounded.

A pair of resistors 81 and 82 are connected in series between the voltage terminal 49 and electrical ground, and a filter capacitor 83 is connected across the resistor 82.

Secondary windings 86 and 87 are respectively connected between the screen grids 88 and 89 of the amplifier output tubes 38 and 39, and the junction 91 of the voltage-dropping resistors 81 and 82. In effect, these windings 86 and 87 are a single center-tapped winding. The voltage-dropping resistors 81 and 82 provide, at the junction terminal 91, a voltage value approximately half-way between the screen grid voltage value for full amplification by the tubes 38 and 39, and for no amplification by these tubes. The secondary windings 86 and 87 are inductively coupled to the 38 kc. resonant circuit inductor 76, thereby to apply to the screen grids 88 and 89 oppositely phased 38 kc. switching signals of sufficient amplitude to alternately apply voltages to these screen grids to drive the switching and amplifying tubes 38 and 39 alternately to full amplification condition and to no amplification or cut-off condition at a 38 kc. rate, whereupon one of the stereo signals, for example the L signal, is derived by the switching action of tube 38, amplified, and applied to the output transformer 47 and loudspeaker 51. Similarly, the switching action by tube 39 derives the other signal, for example the "right" signal, by the time-sampling process, from the composite signal, and amplifies this right signal and applies it to the output transformer 56 and loudspeaker 58. Capacitors 92 and 93 are respectively connected across the audio transformer primary windings 46 and 54, and have small values of capacitance to integrate the pulses of audio information provided by the time-sampling process.

By well-known theory, this alternate switching of the stereo composite signal into two channels of output, when properly synchronized and phased by the 38 kc. switching signal with respect to the suppressed reference wave, will produce the left and right stereo output signals, as described. The network of resistor 61 and capacitor 62 improves the stereo signal separation, by relatively increasing the amplitude of the $L-R$ sidebands of the composite signal. De-emphasis networks, if required, can be connected to the amplifier tube anodes 48 and 57.

In accordance with the invention, by amplifying the composite signal in a common amplifier channel having a single volume control 32, and providing the time-sampling switching function in the output audio stages, the single volume control 32 controls the volume of the left and right output signals at the loudspeakers 51 and 58, and it is unnecessary to have dual volume controls respectively located in the left and right amplifier channels, as in accordance with previous practice. The pilot signal, being derived ahead of the volume control, is at a proper amplitude, unaffected by the volume control, for controlling the switching signal generator tube 71. Also, by switching in the output stages, the need for balance control potentiometers is eliminated, because of the lack of subsequent audio stages which would tend to cause unbalanced magnitude of the signals applied to the loudspeakers 51 and 58. Stereo balance is further improved by the feature of the single volume control, which affects equally the amplitude of both stereo output signals, whereas dual ganged valume controls in the L and R channel amplifiers, unless perfectly matched throughout their ranges (which does not occur with reasonably-priced ganged volume controls), would cause variations in balance when the volume is changed. Switching by means of circuitry for applying the switching signal out of phase to screen grids of the amplifier tubes achieves the switching function without affecting the high-fidelity linear signal amplification of the stereo signals, whereas application of the switching signal to electrodes active for signal amplification would tend to cause distortion of the stereo signals. Also, the screen-grid switching is achieved with readily-obtained magnitude and power of switching signal which can be obtained from a simple and inexpensive one-tube switching signal generator as shown in the drawing.

By way of example, if the audio output tubes 38 and 39 are type 50C5 tubes, then a suitable value of screen bias voltage at the terminal 91 will be 65 volts, and the switching signal applied to the screen grids 88 and 89 will have a peak amplitude of at least 65 volts from zero reference, so as to alternately render the screen grids at +130 volts and 0 volts at the 38 kc. switching rate. Preferably, the switching signal should have a slightly greater value than the bias voltage, to insure complete cut-off of the tubes during the half-cycle of switching voltage that swing the screen grid to zero or a slightly negative voltage. To properly achieve this cut-off of the tubes during the entire half-cycle, a sine-wave switching signal must have a greater amplitude than a square-wave switching signal. The normal bias voltage on the screen grids provides for amplification, at somewhat less than full amplification capabilities of the tubes, for automatically amplifying received monaural AM or FM signals. The switching signal generator automatically produces a switching signal only when a stereo composite signal is received.

While a preferred embodiment of the invention has been shown and described, various other embodiments and modifications thereof will be apparent to those skilled in the art and will fall within the scope of the invention as defined in the following claim.

What we claim is:

A circuit for deriving stereo signals from a detected composite signal including as frequency components thereof a sum combination of the stereo signals, a difference combination of the stereo signals in the form of sidebands of a suppressed reference wave of given frequency, and a pilot signal at a frequency related to said given frequency, said circuit comprising an amplifier channel for said detected composite signal, volume control means connected to the output of said amplifier channel for adjusting the amplitude of said detected composite signal, means connected in said amplifier channel ahead of said volume control means for deriving said pilot signal from the detected composite signal whereby the amplitude of the derived pilot signal is unaffected by said volume control means, a switching signal generator connected to provide a switching signal under the control of said derived pilot signal, and a time-sampling switching circuit comprising first and second audio amplifier devices each having an input electrode connected to receive the volume-controlled composite signal from said amplifier channel, said audio amplifier devices being of the screen-grid type, and including means for biasing said screen grids at a value approximately half-way between the values for normal full amplification and for non-amplification by said amplifier devices, and means to apply said switching signal to said screen grids in opposite phases and at an amplitude to render said amplifier devices alternately in amplifying condition and non-amplifying condition.

References Cited

UNITED STATES PATENTS

| | | | |
|---|---|---|---|
| 3,152,224 | 10/1964 | Cotsworth | 179—15 |
| 3,176,074 | 3/1965 | Browne | 179—15 |
| 3,225,143 | 12/1965 | Parker | 179—15 |
| 3,226,481 | 12/1965 | Wilson et al. | 179—15 |
| 3,258,537 | 6/1966 | Procter et al. | 179—15 |
| 3,287,501 | 11/1966 | Rabeler | 179—15 |

OTHER REFERENCES

Browne: "New Stereophonic Broadcasting System," British Communications and Electronics, March 1960, pages 204 and 205 relied on.

JOHN W. CALDWELL, *Acting Primary Examiner.*

R. L. GRIFFIN, *Examiner.*